United States Patent [19]

Mühlfeld et al.

[11] Patent Number: 5,079,329

[45] Date of Patent: Jan. 7, 1992

[54] METHOD OF MAKING A LATENTLY REACTIVE, PASTY MOLDING MATERIAL

[75] Inventors: Horst Mühlfeld, Grasellenbach; Günter Schuhmacher, Weinheim, both of Fed. Rep. of Germany

[73] Assignee: Firma Carl Freudenberg, Weinheim, Fed. Rep. of Germany

[21] Appl. No.: 516,351

[22] Filed: May 1, 1990

[30] Foreign Application Priority Data

Jun. 22, 1989 [DE] Fed. Rep. of Germany ....... 3920468

[51] Int. Cl.$^5$ .............................................. C08G 18/10
[52] U.S. Cl. ........................................ 528/61; 528/63; 524/494
[58] Field of Search ................... 528/61, 63; 524/494

[56] References Cited

U.S. PATENT DOCUMENTS 3,871,911 8/1975 Conacher, Jr. ................. 117/161 K
4,552,913 6/1985 Wolfe et al. ......................... 524/240

FOREIGN PATENT DOCUMENTS 137475 10/1974 United Kingdom .

Primary Examiner—Paul R. Michl
Assistant Examiner—Yong S. Lee
Attorney, Agent, or Firm—Kenyon & Kenyon

[57] ABSTRACT

This invention is directed to a latently reactive pasty molding material (masterbatch), which only becomes reactive above ambient temperature (about 25° C.), for producing temperature-resistant, elasticized, molded, duromer components which is comprised of a mixture of a methylene-diphenyl diisocyanate and a diamine which is not reactive at ambient temperature, but is reactive above about 120° C., which is selected from the group consisting of an alkali-halide salt complex, which is the reaction product of three moles at 4,4'-diphenylmethane diamine and of one mole halide salt, and alternatively a hexamethylene-6,6'-diamine carbamate; and about 1 to 625 parts by weight (per 100 parts methylene-diphenyl diisocyanate) of a low-molecular weight isocyanate-terminated polyesterpolyol-diisocyanate prepolymer, produced from polycaprolactone and a mixture of the toluylene diisocyanate isomers. The mixture has a NCO excess of up to 15% more than the sum of the free OH— and NH$^2$— constituents. It can be modified with fillers and is moldable at low pressures. The molding material of this invention is also useful as an impregnating agent for the glass-fiber mats.

12 Claims, No Drawings

METHOD OF MAKING A LATENTLY REACTIVE, PASTY MOLDING MATERIAL

FIELD OF THE INVENTION

The present invention relates to a method for making a latently reactive, pasty molding material useful in the production of temperature resistant, elasticized, molded, duromer components such as motor casings, thermal shields, suction pipes used in motor vehicle manufacturing, supporting disks for supporting rollers used in textile machines and the like.

BACKGROUND OF THE INVENTION

Conventional phenolic, epoxide and unsaturated polyester resins used to make such duromer components are highly stable and exhibit a lasting high-temperature resistance up to over about 200° C. However, these advantageous properties are limited due to the considerable brittleness of these thermosetting plastics—especially at temperatures below about 0° C.

Better resistance to cold at temperatures down to minus 40° C. can be achieved by using thermosetting plastics, for example, polypropylene reinforced with glass-fiber mat. A significant disadvantage of these materials is poor dimensional stability at temperatures above about 130° C. Another disadvantage is the high pressures, e.g., up to 1000 tons/m$^2$ needed for molding such materials which results in high tool and molding costs, particularly in the manufacture of large-volume components.

It has proven difficult to make duromer components that have the physical properties specified by automobile manufacturers with conventional resins In particular, it has been difficult to obtain high notch impact resistance at temperatures down to about minus 40° C. and dimensional stability up to about 250° C. (particularly significant for molded components located close to a motor). Improvements in the molding materials for making duromer components have been sought, in particular, deformability at molding pressures, which lie at about 100 t/m$^2$ or less; improved storage stability even when stored and transported for longer periods of time (improved availability of, premanufactured "masterbatch" liquid or pasty molding material mixture in larger quantities); very low viscosity of the molding materials to provide considerable leeway for adding fillers (thus providing a considerable range for the mechanical properties of the molded articles to be manufactured); and lasting bondability of the masterbatch with other polyurethane materials during and/or after molding.

OBJECTS AND SUMMARY OF THE INVENTION

An object of this invention is to provide a latently reactive molding material, as masterbatch, from which elasticized, molded, duromer components which meet the specifications required by automobile manufactures can be manufactured.

Another object of the invention is to provide a masterbatch which has an improved combination of physical characteristics including deformability, storage stability, viscosity and bonding properties, that meet specifications set by the automobile industry.

The present invention provides a method for making a latently reactive, pasty molding material for producing elasticized, molded, duromer components, which are dimensionally stable from about minus 40° C. to plus 250° C., comprising the steps of:

preparing a mixture having an excess of NCO groups of up to 15% more than the sum of the free OH— and NH$_2$— groups, the mixture comprising:

a) a methylene-diphenyl diisocyanate having a functionality of about 2.0 to 3.0;

b) a diamine which is only reactive at temperatures above about plus +120° C. and selected from the group consisting of hexamethylene-6,6'-diamine carbamate and an alkali-halide salt complex, comprised of about 3 moles of 4,4'-diphenylmethane diamine and about one mole of halide salt; and c) about 1 to 625 parts by weight (per 100 parts methylene-dephenyl diisocyanate) of a polyester-polyol-diisocyanate prepolymer having a molecular weight of about 800 to 1350, which is the reaction product of polycaprolactone educts having a molecular weight of about 500 to 1000 and an 80/20 isomer mixture of 2,4- and 2,6-toluylene diisocyanate.

The invention also provides latently reactive molding materials, prepared in accordance with the above-described method, which may include large amounts of filler, e.g., up to 150% wt., and that can be molded at pressures less than about 100 t/m$^2$ preferably about 10 t/m$^2$.

The invention also provides composites comprised of glass-fiber mat impregnated with molding material prepared in accordance with the above-described method.

DETAILED DESCRIPTION OF THE INVENTION

The molding material has an excess of NCO groups of up to 15% more than the sum of the available, free OH and NH$^2$ groups. This excess reduces the harmful effects of an insufficient number of isocyanate groups. If stoichiometric quantities of isocyanate, hydroxyl and amine groups are employed, then an NCO deficiency will result due to isocyanate reactions with the moisture in the mixture; or fluctuations in the OH content of the polyols; or uncontrollable secondary reactions, for example allophanate, biuret or isocyanurate formation. Moreover, methylene diphenyl diisocyanate, particularly the 4,4,'-isomer, cannot be produced without higher condensation products causing its actual NCO content to be about 3% or more below its theoretical values.

The above mentioned excess of NCO groups ensures a constant functionality of about 2.0 to 3.0; thus providing a relatively constant NCO content to the coreactants.

At ambient temperature, i.e., about 25° C., a molding material prepared in accordance with the foregoing method has been found to be storage stable for periods of up to six weeks or more. Reaction of the molding material ingredients begins to proceed at a noticeable rate at temperatures above about 100° C. and proceeds very quickly at about 120° to 180° C., for example, at 170° C., so that sheets about 2 mm thick may be hardened through in about 30 seconds.

The methylene-diphenyl diisocyanate component having a functionality of 2.0 to 3.0 may be 4,4'0 methylene-diphenyl diisocyanate (MDI) (untreated) or a carbon-diamide-modified MDI. Both are commercially available polyurethane educts.

The halide salt (e.g., NaCl— or NaBr—) containing diamines which are not reactive at ambient temperature, but are reactive above about +120° C., are preferably complexes of about 3 moles 4,4'-diphenylmethane diamine and 1 mole alkali-halide salt. At reaction temperatures (e.g., above 120° C.), these complexes break down into their individual components (3 parts diamine to 1 part halide salt). The diamine can react spontaneously with the isocyanate to form a polyurethane. With hexamethylene-6,6'-diamine carbamate, on the other hand, not only is a polyurethane spontaneously formed, but at the same time an expansion (foaming) occurs due to liberated carbon dioxide. In this manner, one can reduce the density of a duromer component to be molded.

The third ingredient of the molding material, is an isocyanate-terminated polyesterpolyol-diisocyanate prepolymer having a molecular weight of about 800 to 1350, which is the reaction product of polycaprolactone educts having a molecular weight of about 500 to 1000 and a 2,4-/2,6- isomer mixture of the toluylene diisocyanate having a 2,4:2,6 ratio of about 80:20. This prepolymer is added to the molding material in an amount of about 1 to 625 parts by weight per 100 parts of the higher functional isocyanate.

Above about 120° C., the diamine reacts with the polyfunctional MDI and with the terminal isocyanate groups of the polyester-polyurethane prepolymers to form polyurethane. The rate of the polyurethane forming reaction below this temperature is not significant.

A feature of a preferred embodiment the invention is that the molding material which is not reactive at ambient temperature may have a viscosity of only about 1000 to 5000 cP. This viscosity range is low enough to enable production of highly-filled yet flowable, pasty molding material. It is generally known that it may be necessary to add a considerable amounts of filler, for example, glass fibers, chalk powder, fly ash, hollow spheres (microspheres) or mixtures thereof to vary the mechanical properties of the molded articles to be produced. With the low viscosity molding material of this invention, large quantities of filler do not usually produce hardening to the extent that molding pressures in the range of about 1000 t/m$^2$ are required for molding operations. It has been observed that even when 150 percent by weight of filler is added to the molding material; molding operation can be accomplished at pressures less than 100 t/m$^2$ and as low as in the range of about 10 t/m$^2$.

The method of this invention provides a molding material that can accommodate large quantities of filler due to its low viscosity. Therefore, those skilled in the art can vary the mechanical properties of the elasticized, duromer molded articles manufactured with the molding material over a wide range, by selection of the type and quantity of filler. For example, the hardness, strength, rigidity, bending strength, dimensional stability and density of the finished molded article can be easily modified. Adding glass fibers increases the strength and the modulus of elasticity of a molded article. Adding fine-granular fillers, for example chalk, increases the strength of a molded article. Adding fly ash to the low-viscosity molding material decreases, the density of a molded article.

In a further refinement of the invention, it is possible to saturate a substrate, for example, a glass fiber mat, with molding material which may contain additional fillers, as described above, to produce very durable molded composites. Due to the low viscosity of the molding material, it can completely penetrate into the pores of a glass fiber mat, thereby substantially increasing the mechanical stability of the resulting molded article being formed.

The molded composites have high dimensional stability and high tensile strength and they can be simply manufactured by saturating glass-fiber mats with the molding material of the invention and hot-pressing. Additional filler material can also be incorporated into the molding material, as mentioned above, to further modify the mechanical properties of the composites.

In addition, with this invention molding conditions may be varied widely because the mechanical resistance to the molding pressure is relatively small, in fact significantly smaller than in conventional molding of thermoplastics. This is primarily due to the fact that molding material prepared in accordance with the invention is not very viscous.

The preferred operating temperature range of 120° to 180° C. for molding has proven to be particularly favorable for the molding material of this invention in light of a short cure time and resulting short cycle times on a molding press.

The molding material of this invention can easily be utilized in a conventional molding press in combination with other polyurethane materials, even when they exist in a foam form, by simultaneously molding a composite of both materials at about 160° to 180° C. It is not necessary to use an adhesive agent to bond the materials because the molding material is latently reactive.

Alternatively, a completed molded duromer article may be coated with a liquid polyurethane-urea reaction mixture, which upon curing will solidly bond two materials together. This bonding is so effective, without adhesive agents, that the resulting composites are so stable, that they can no longer be separated in a nondestructive manner.

In the following Examples, the production of molding material and its further processing into a flexible, molded, duromer articles is described.

EXAMPLE 1

| Prepolymer Formulation: | |
| --- | --- |
| 100.0 | parts by weight polycaprolactone with a molecular weight of 540 |
| 59.2 | parts by weight toluylene diisocyanate; 80/20 isomer mixture 2,4-/2,6- |

Producing the Prepolymer

Polycaprolactone is reacted with toluylene diisocyanate by mixing for 30 minutes at a temperature of 100° C. to produce a prepolymer having an excess isocyanate content of about 8.18% and a viscosity of about 54000 cP.

| Formulation of the Latently Reactive Molding Material | |
| --- | --- |
| 86.2 | parts by weight prepolymer having a NCO-value of 8.18% |
| 33.8 | parts by weight untreated MDI (untreated 4,4'-methylene-diphenyl diisocyanate) with an NCO-value of 30.0% (as determined by analysis) |
| 79.0 | parts by weight [NaCl].3 [4,4'-diphenylmethane diamine] including about 50% wt. plasticizer (dioctyl phthalate) |
| 50.0 | parts by weight microspheres (d: about 100 μm) |

Producing the Latently Reactive Molding Material

The three main ingredients—prepolymer, untreated MDI, and diamine-alkali salt complex are premixed in a mixing vessel at ambient temperature. The microspheres are subsequently added during mixing. The mixture forms a paste having excellent casting characteristics and a viscosity of 65000 cP.

This paste can be stored for at least about six weeks in a tightly sealed container with the exclusion of moisture without loss of its processing characteristics or undergoing any significant property changes.

Molds for a Motor Casing

A fiberglass blank weighing 450 g, is punched out of an endless fiberglass mat and placed in a mold heated to 170° C. The molding material is poured over the fiberglass blank; a second fiberglass blank is inserted and the mold is closed. With a molding pressure of 1 kg/cm$^2$, the fiberglass bland is completely impregnated with the paste, and the mold is filled in evenly. The molding operation is finished after about 30 seconds producing a 2 mm thick molded composite which is completely hardened through. Secondary treatment, i.e., cure is not necessary. Strength properties were measured on test plates, manufactured with the same method as the molded component above. The test plate dimensions were 300 mm×200 mm×4 mm with a fiberglass content of 25 percent by weight.

| | |
|---|---|
| Tensile strength: | 70 N/mm$^2$ |
| Breaking elongation: | 1.8% |
| Modulus of elasticity: | 4200 N/mm$^2$ |
| Flexural strength: | 101 N/mm$^2$ |
| Flexural modulus: | 4650 N/mm$^2$ |
| Impact resistance at ambient temperature: | 40 mJ/mm$^2$ |
| Impact resistance at minus 40° C.: | 51 mJ/mm$^2$ |
| Notch impact resistance at ambient temperature: | 40 mJ/mm$^2$ |
| Notch impact resistance at minus 40° C.: | 44 mJ/mm$^2$ |

Testing the Temperature Resistance

To test the temperature resistance of the duromer molded material, a creepage test is performed. The test involves observing the deformation of loaded test rods as a function of temperature. After 24 hours at 180° C. under load, test rods manufactured substantially in accordance with the above example showed no observable deformation, while under the same load, test rods made of fiberglass-reinforced polypropylene, for example, sagged completely through to the base of the testing instruments, after one hour at 150° C. This simple test demonstrates the temperature resistance of materials produced according to the invention.

Manufacturing a Motor Casing with Polyurethane Soft Foam

To manufacture a composite for a motor casing having a soft polyurethane foam portion that provides sound absorption: Fiberglass mat blanks are saturated with the molding material and placed together with a soft polyurethane foam blank in a mold heated to 200° C. A molding pressure of 1 kg/cm$^2$, for one minute is sufficient to securely bond the polyurethane foam and molding material together.

Notably, the soft polyurethane foam and molding material can be bonded together in one molding step forming a composite that cannot be separated in a nondestructive manner.

EXAMPLE 2

Formulation of a Latently Reactive Molding Material 85.0 parts by weight prepolymer, as in Example 1
115.0 parts by weight untreated MDI, as in Example 1
75.0 parts by weight hexamethylene-6,6'- diamine carbamate with a molecular weight of 160
180.0 parts by weight chalk with an average particle diameter of 3 μm.

Producing a Latently Reactive Molding Material

The three main ingredients; prepolymer, untreated MDI and hexamethylene-diamine carbamate are premixed in a mixing vessel at ambient temperature. The chalk is then added to the molding material by mixing. A paste with good casting characteristics and a viscosity of 86000 cP is formed.

Strength properties were measured on test plates fabricated from fiberglass mat blanks, saturated with the molding material and molded for 30 seconds at 170° C. at a molding pressure of 1 kg/cm$^2$. A secondary treatment, i.e., cure, was not necessary. In the final product, the fiberglass content was 25 percent by weight.

| | |
|---|---|
| Tensile strength: | 66 N/mm$^2$ |
| Breaking elongation: | 1.6% |
| Modulus of elasticity: | 3800 N/mm$^2$ |
| Flexural strength: | 80 N/mm$^2$ |
| Impact resistance at ambient temperature: | 36 mJ/mm$^2$ |
| Impact resistance at −40° C.: | 47 mJ/mm$^2$ |

EXAMPLE 3

Formulation of a Latently Reactive Molding Material 68.0 parts by weight prepolymer, as in Example 1
36.0 parts by weight untreated MDI, as in Example 1
19.0 parts by weight [NaCl]. 3 [4,4'- diphenylmethane diamine] with 50% wt. plasticizer (dioctyl phthalate)
20.7 parts by weight hexamethylene-6,6'- diamine carbamate with a molecular weight of 160
48.0 parts by weight chalk with an average particle diameter of 3 μm Producing Latently Reactive Molding Material The four main constituents; prepolymer, untreated MDI, diamine- alkali salt complex and hexamethylene-diamine carbamate are premixed in a mixing vessel and the chalk is subsequently stirred in. The viscosity of the castable paste lies at 72000 cP.

The strength properties were determined on testing plates, which had been fabricated from endless fiberglass mats, saturated with the reactive paste for 30 seconds at 170° C. with a molding pressure of 1 kg/cm$^2$. A secondary treatment [cure] was not necessary.

The fiberglass contents amount to 25 percent by weight.

| | |
|---|---|
| Tensile strength: | 66 N/mm$^2$ |
| Breaking elongation: | 1.66% |
| Modulus of elasticity: | 3800 N/mm$^2$ |
| Flexural strength: | 80 N/mm$^2$ |
| Impact resistance at ambient temperature: | 36 mJ/mm$^2$ |
| Impact resistance at −40° C.: | 47 mJ/mm$^2$ |

What is claimed is:

1. A method for making a latently reactive, pasty molding material for producing elasticized, molded, duromer components, which are dimensionally stable from about minus 40° C. to plus 250° C., comprising the steps of preparing a mixture including:
   a) a methylene-diphenyl diisocyanate with a functionality of about 2.0 to 3.0,
   b) a diamine which is only reactive above about plus 120° C. selected from the group consisting of hexamethylene-6,6'-diamine carbamate and an alkali-halide salt complex, comprised of 3 moles of 4,4'-diphenylmethane diamine and one mole of halide salt; and
   c) 1 to 625 parts by weight (per 100 parts methylenediphenyl diisocyanate) of an isocyanate terminated polyesterpolyol-diisocyante prepolymer having a molecular weight of about 800 to 1350, which is the reaction product of polycaprolactone educts having a molecular weight of about 500 to 1000 and an 80/20 isomer mixture of 2,4/2,6-toluylene diisocyanate;
   said mixture having an excess of NCO groups of up to 15% more than the sum of the free OH— and NH$_2$—groups.

2. The method according to claim 1, further comprising the step of adding at least one filler material.

3. The method according to claim 2, wherein the filler comprises up to 150% by weight of the mixture.

4. The method according to claim 3, wherein the filler material is selected from the group consisting of glass fibers, chalk powder, fly ash, and microspheres.

5. The method according to claim 1, wherein the mixture has a viscosity in the range of about 1000 to 5000 cP.

6. A method for molding a duromer component comprising the step of molding a mixture prepared in accordance with claim 1 at a pressure less than about 100 t/m$^2$ and a temperature of about 120° to 180° C.

7. The method according to claim 6, wherein the pressure is in the range of about 10 t/m$^2$.

8. A latently reactive molding composition comprising:
   a) a methylene-diphenyl diisocyanate with a functionality of about 2.0 to 3.0;
   b) a diamine which is only reactive above about plus 120° C. selected from the group consisting of hexamethylene-6,6'-diamine carbamate and an alkali-halide salt complex, comprised of 3 moles of 4,4'-diphenylmethane diamine and one mole of halide salt; and
   c) 1 to 625 parts by weight (per 100 parts methylenediphenyl diisocyanate) of an isocyanate terminated polyesterpolyol-diisocyante prepolymer having a molecular weight of about 800 to 1350, which is the reaction product of polycaprolactone educts having a molecular weight of about 500 to 1000 and an 80/20 isomer mixture of 2,4/2,6-toluylene diisocyanate;
   said mixture having an excess of NCO groups of up to 15% more than the sum of the free OH— and NH$_2$—groups.

9. The molding composition of claim 8 further comprising a filler.

10. The molding composition of claim 9 wherein the filler comprises a material selected from the group consisting of glass fibers, chalk powder, fly ash and microspheres.

11. A method for making a composite comprising the steps of impregnating a glass-fiber mat with a molding material prepared in accordance with claim 1 and molding the impregnated mat.

12. A composite comprising a glass fiber mat impregnated with molding material of claim 1.

* * * * *

UNITED STATES PATENT AND TRADEMARK OFFICE
CERTIFICATE OF CORRECTION

PATENT NO. : 5,079,329

DATED : January 7, 1992

INVENTOR(S) : Horst Muhlfeld, et al.

It is certified that error appears in the above-identified patent and that said Letters Patent is hereby corrected as shown below:

On the Title page, item [57], col. 2, Abstract, line 19, change "NH²" to --NH₂--.

Column 2, line 37, change "NH²" to --NH₂--.

Column 2, line 65, change "4,4' 0 methy-" to --4, 4'-methy---.

Signed and Sealed this

Twenty-eighth Day of September, 1993

Attest:

BRUCE LEHMAN

*Attesting Officer*  *Commissioner of Patents and Trademarks*